United States Patent
Fischer et al.

(10) Patent No.: US 6,963,285 B2
(45) Date of Patent: Nov. 8, 2005

(54) OUTAGE NOTIFICATION DEVICE AND METHOD

(75) Inventors: Roger L. Fischer, Dallas, TX (US); Russell B. Schultz, Colcord, OK (US)

(73) Assignee: Basic Resources, Inc., Dallas, TX (US)

( * ) Notice: Subject to any disclaimer, the term of this patent is extended or adjusted under 35 U.S.C. 154(b) by 57 days.

(21) Appl. No.: 10/676,655

(22) Filed: Sep. 30, 2003

(65) Prior Publication Data

US 2004/0061616 A1 Apr. 1, 2004

Related U.S. Application Data

(60) Provisional application No. 60/415,070, filed on Sep. 30, 2002.

(51) Int. Cl.[7] ............................................. G08B 21/00
(52) U.S. Cl. .................. 340/635; 340/660; 340/870.02
(58) Field of Search ................................ 340/635, 660, 340/661, 502, 506, 531, 870.02, 870.03, 340/870.07, 539.14; 702/57, 64; 370/356, 370/401

(56) References Cited

U.S. PATENT DOCUMENTS

| | | | |
|---|---|---|---|
| 4,455,453 A | 6/1984 | Parasekvakos et al. | 179/2 AM |
| 4,764,952 A | 8/1988 | Feliu | 379/107 |
| 5,010,568 A | 4/1991 | Merriam et al. | 379/107 |
| 5,566,339 A | 10/1996 | Perholtz et al. | 395/750 |
| 5,784,441 A | 7/1998 | Davis et al. | 379/106.01 |
| 5,874,903 A | 2/1999 | Shuey et al. | 340/870.02 |
| 6,058,355 A | 5/2000 | Ahmet et al. | 702/62 |
| 6,137,868 A | 10/2000 | Leach | 379/106.01 |
| 6,300,881 B1 | 10/2001 | Yee et al. | 340/870.02 |
| 6,301,674 B1 | 10/2001 | Saito et al. | 713/340 |
| 6,327,541 B1 | 12/2001 | Pitchford et al. | 702/62 |
| 6,351,223 B1 | 2/2002 | DeWeerd et al. | 340/870.03 |
| 6,360,177 B1 * | 3/2002 | Curt et al. | 702/64 |
| 6,437,692 B1 | 8/2002 | Petite et al. | 340/540 |
| 6,453,248 B1 | 9/2002 | Hart et al. | 702/58 |
| 6,466,138 B1 | 10/2002 | Partyka | 340/870.11 |
| 6,583,720 B1 * | 6/2003 | Quigley | 340/521 |
| 6,690,675 B1 * | 2/2004 | Kung et al. | 370/401 |

(Continued)

FOREIGN PATENT DOCUMENTS

WO WO 00/74306 A2 12/2000 ........... H04L 12/00

OTHER PUBLICATIONS

Advertisement for Power-Out Alert at the Internet website http://www.qasupplies.com/ircstore/poweroutalert.html, 1 pg., dated Jun. 26, 2001.

(Continued)

Primary Examiner—Van T. Trieu
(74) Attorney, Agent, or Firm—Hunton & Williams LLP

(57) ABSTRACT

An outage notification system for detecting a power outage at a customer location is provided. The outage notification system comprises a first outage notification device operably coupled to a first circuit at the customer location, a second device operably coupled to a second circuit at the customer location. The first device is operable to determine a status of power supply to the first circuit and communicate the status of power supply to the first circuit to the second device. The second device is operable to determine a status of power supply to the second circuit (or other desired parameter in an alternative embodiment) and notify, via a network, a receiving system associated with the electric utility of a power outage at the customer location based at least in part on the statuses of power supply to the first and/or second circuits.

18 Claims, 5 Drawing Sheets

U.S. PATENT DOCUMENTS

2002/0062198 A1   5/2002   Dawson ..................... 702/62
2002/0072868 A1   6/2002   Bartone et al. ............... 702/62

OTHER PUBLICATIONS

Advertisement for International Ripening Company entitled *About IRC* at the Internet website http://www.qasupplies.com/iircstore/info.html, 3 pgs., dated Jun. 26, 2001.

Advertisement for IRC entitled *Quality Assurance Products for Perishable Foods, Environmental Management & Refrigera..* at the Internet website http://www.qasupplies.com/, 3 pgs., dated Jun. 26, 2001.

Advertisement for Hometown Connections entitled *Metering, Outage Detection and Power Quality Monitoring*, at the Internet website http://www.hometownconnections.com/itron-2.html, 4 pgs., dated Jun. 26, 2001.

Advertisement for American Innovations entitled *American Innovations Introduces Software For Automatic Notification of Power Restoration*, at the Internet website http://www.aimetering.com/News&Events/PressReleases/AIMAlert.htm, 1 pg., dated Jun. 26, 2001.

Advertisement for American Innovations entitled *The Company*, at the Internet website http://www.aimetering.com/TheCompany/thecompany.htm, 1 pg., dated Jun. 26, 2001.

Advertisement for Winland Electronics entitled *Power-Out Alert Solution*, at the Internet website http://www.winland.com/demo.php3?id=8, 2 pgs., dated Jun. 26, 2001.

Advertisement for Communicator 860 entitled *Communicator 860 Remote Monitor*, at the Internet website http://www.onthelevel.com/860.html, 3 pgs., dated Jun. 26, 2001.

Advertisement for AMRON entitled *AMRON™ System Solutions*, at the Internet website http://www.amronamr.com/systems/amronoutagesystem.htm, 1 pg., dated Jun. 26, 2001.

Advertisement for AMRON entitled *Our Products:*, at the Internet website http://www.amronamr.com/products.htm, 2 pgs., dated Jun. 26, 2001.

Advertisement for AMRON entitled *Our Products-AMRON I™ Outage/Restoration Notification Device*, at the Internet website http://www.amronamr.com/products/amron1.htm, 1 pg., dated Jun. 26, 2001.

Advertisement for AMRON entitled *Our Products-AMRON ™ Lite Outage Restoration Notification Device*, at the Internet website http://www.amronamr.com/products/amronlite.htm, 1 pg., dated Jun. 26, 2001.

Advertisement for SecurityPLUS entitled *Environmental Controls*, at the Internet website http://www.securityplusinc.com/environ/, 3 pgs., dated Jun. 26, 2001.

Advertisement for EPOS Corporation entitled *IVR and WEB Self-Service Solutions*, at the Internet website http://www.epos.com/news/menu.asp, 3 pgs., dated Jun. 26, 2001.

Press Release for Dorrough Electronics Inc. entitled *Dorrough Introduces Power Line Monitor*, at the Internet website http://www.dorrough.com/What_s_New/News/Power_Line_Monitor/power_line_monitor, 1 pg., dated Jun. 26, 2001.

Advertisement for Dorrough Electronics Inc. entitled *PLM-120 Power Line Monitor*, at the Internet website http://www.dorrough.com/What_s_New/PLM-120/plm-120.html, 1 pg., dated Jun. 26, 2001.

Advertisement for Bonnel Technologies entitled *I-Tel 3*, at the Internet website http://www.bonnel-tech.com/en/telecom/it3.htm, 7 pgs., dated Jun. 26, 2001.

News Release for EPOS entitled *EPOS Announces for Con Edison's New Power Outage Notification Device*, at the Internet website http://www.epos.com/news/conedison.asp, 2 pgs., dated Jun. 26, 2001.

Levine, Ron, *Power Up (Or Not)*, article at the Internet website http://www.solved.net/issue6/howto.htm, 7 pgs., dated Jun. 26, 2001.

Press Release for ComEd entitled *ComEd Launches Automatic Outage Notification/Power Link*, at the Internet website http://www.ucm.com/news/comed/display.asp?a=ComEd&rec_id=423 , 2 pgs., dated Aug. 22, 2001.

Advertisement for Itron entitled *Distribution System Efficiency and Reliability-Outage Detection & Restoration Notification*, at the Internet website http://www.itron.com/solutions/solution.asp?ID=33, 2 pgs., dated Aug. 23, 2001.

Advertisement for Itron entitled *Distribution System Efficiency and Reliability-Outage Detection & Restoration Notification*, at the Internet website http://www.itron.com/solutions/solution.asp?ID=33, 10 pgs., dated Sep. 21, 2001 (with an attachment entitled: *United Electric Cooperative : Missouri co-op Finds Itron Telephone AMR a good fit for rural service territory*).

Advertisement for Itron entitled *Collection Systems*, at the Internet website http://www.itron.com/products/product.asp?id=21, 2 pgs., dated Aug. 23, 2001.

Advertisement for AMRON, at the Internet website http://www.amronamr.com/index2.htm, 1 pg., dated Aug. 23, 2001.

Advertisement for AMRON entitled *Amron Products*, at the Internet website http://www.amronamr.com/products.htm, 1 pg., dated Aug. 23, 2001.

Advertisement for AMRON entitled *Our Products*, at the Internet website http://www.amronamr.com/products/amronlite.htm, 1 pg., dated Aug. 23, 2001.

Advertisement for AMRON entitled *About AMRON*, at the Internet website http://www.amronamr.com//about.htm, 1 pg., dated Aug. 23, 2001.

Advertisement for AMRON entitled *Our Products : Outage Notification Products*, at the Internet website http://www.amronamr.com/productFAQ.htm, 2 pgs., dated Aug. 23, 2001.

Advertisement for Itron entitled *Events*, at the Internet website http://www.itron.com/knowledge/event.asp?ID=88, 1 pg., dated Sep. 21, 2001.

AMRON, Brochure 23 pgs., Leach Industries, Inc., Macon, Georgia.

* cited by examiner

FIG. 5

*TXU Energy*

Account Home
Account Summary
Customer Service
Using this Site

Admin Home Page

Logout

Device Name: Pet Store
Location Name: Bedford
Device ID: 100000000000040
Device Type: AFX
Device Version: 0
Service Level: Basic submit
cancel

Designated Contacts — Select a Primary Contact

Who should we contact? Roger — 102a
How should we contact them? E-mail — 104a
What is the email address, phone, fax, or pager number? Roger@email.com — 106a
How long should we wait before contacting? (0-99 minutes) 0 Minutes — 108a Who should we contact? Roger — 102b
How should we contact them? Phone — 104b
What is the email address, phone, fax, or pager number? 555-555-5555 — 106b
How long should we wait before contacting? (0-99 minutes) 15 Minutes — 108b Who should we contact? Mary — 102c
How should we contact them? Fax — 104c
What is the email address, phone, fax, or pager number? 555-555-5550 — 106c
How long should we wait before contacting? (0-99 minutes) 35 Minutes — 108c

| $V_1$ | $P_1$ | CALL ELECTRIC UTILITY | CALL CUSTOMER |
|---|---|---|---|
| 0 | 0 | N | N |
| 0 | 1 | N | Y |
| 1 | 0 | N | Y |
| 1 | 1 | Y | Y |

POWER OFF = 1
POWER ON = 0

| $V_1$ | $P_1$ | $P_2$ | CALL ELECTRIC UTILITY | CALL CUSTOMER |
|---|---|---|---|---|
| 0 | 0 | 0 | N | N |
| 0 | 0 | 1 | N | Y |
| 0 | 1 | 0 | N | Y |
| 0 | 1 | 1 | N | Y |
| 1 | 0 | 0 | N | Y |
| 1 | 0 | 1 | N | Y |
| 1 | 1 | 0 | N | Y |
| 1 | 1 | 1 | Y | Y |

POWER OFF = 1
POWER ON = 0

OUTAGE NOTIFICATION DEVICE AND METHOD

CROSS-REFERENCE TO RELATED APPLICATIONS

The present invention claims benefit of U.S. Provisional Application No. 60/415,070 filed Sep. 30, 2002, the entirety of which is incorporated by reference herein for all purposes.

FIELD OF THE INVENTION

The present invention relates in general to the field of notification and detection devices and more particularly, but not by way of limitation, to a power outage notification system and method to report information related to the loss of power supply at a customer location.

BACKGROUND OF THE INVENTION

When a customer of an electric utility suffers a power outage, the customer typically must notify the electric utility of the power outage. In the event that the power outage occurs in the middle of the night or when the customer is otherwise unable to detect the outage, the residence or facility may go without electricity for a considerable amount of time. In instances where the continuous supply of power is crucial to the customer, such as for hospitals, manufacturing facilities and food storage facilities, this conventional outage notification process can severely affect the customer's operations.

Accordingly, a number of complex and expensive devices have been employed in the past to detect power outages and report them to the electric utilities. Such devices may implement a connection to the power supply at the customer location coupled to the serial port of personal computers dedicated for outage notification. Once an outage is detected at the serial port and a communication from the personal computer has been received by the electric utility, the electric utility may dispatch the appropriate technicians to re-establish power or repair the problem causing the outage. Unfortunately, such systems suffer from severe limitations with respect to efficiently and cost effectively dealing with power outages at the customer location. To illustrate, the use of such systems typically require the use of a personal computer or workstation, either of which generally are expensive to purchase and maintain. Further, such systems typically notify the electric utility in the event that power supply is lost on any circuit, resulting in wasted time and effort on the electric utility's part when the cause of the power outage to the circuit results from a local cause at the customer location and not from a problem for which the electric utility is responsible.

SUMMARY OF THE INVENTION

Thus, a need exists for an improved outage notification system, outage detection device and method that overcomes the disadvantages of prior outage notification systems and provides a more useful and cost efficient outage notification system.

Embodiments of the present invention overcome one or more of the problems noted above, and realize one or more additional advantages. The present invention provides an outage notification system for detecting outage of power supply at a customer location. The outage notification system or device comprises a first device operable to detect the loss of power supply at a first circuit of the customer location, the first device operable to communicate a status of the first device of power supply at the first circuit as either available or not available.

The outage notification device may also include a second device operable to detect the loss of power supply (or some other information) at a second circuit of the customer location, the second device operable to communicate a status of the second device of power supply (or other desired information) at the second circuit as either available or not available. The outage notification device may also include a microcontroller in communication with the first and second devices. The microcontroller operable to analyze the status of the first and second devices of the power supply at the first and second circuits received by the first and second devices to determine whether power supply may have been lost to the facility or customer premises. The outage notification device may also include a network interface or communication device operable to communicate with a receiving system.

According to one embodiment of the present invention, the communication device is operable to report on the outage of power supply at the customer location to the receiving system when the microcontroller determines that power supply is lost at the first and second circuits. According to another embodiment of the present invention, the communication device is operable to report on the outage of power supply at the customer location to the receiving system when the microcontroller determines that power supply is unavailable at one of the first or second circuits.

In other embodiments, the outage notification system may further include a dedicated communication link between the first or second device and the microcontroller. In this instance, the communication link may be a wireless communication link, while in other embodiments, the communication link may utilize telephone lines or power lines at the customer location.

In one embodiment, the outage notification system includes a third device operable to detect the loss of power supply at a third circuit of the customer location, the third device operable to communicate the status of the third device of power supply at the third circuit. In this embodiment, the first device and the communication device may be integrated or contained within a single housing. As such, the first device may communicate with the communication device in an integrated communication manner, while the second and third devices communicate with the communication device in a wireless manner, in one embodiment, or by utilizing the telephone lines, power lines or other dedicated wiring within the customer location, according to other embodiments.

According to yet another embodiment of the present invention, the first device may include an adaptor for powering the first device by coupling to an electric power outlet at the customer location. The first device also having a battery for powering the first device in the event of an outage at the outlet at the customer location. In one embodiment the first device may further include an indicator system to indicate the status of the power supply of the first circuit, as well as, the status of the first device, such as the status of a battery included with a first device. The indicator, in one embodiment, may be a light, while in other embodiments the indicator may be a speaker. The indicator or enunciator may be a light, speaker or other device for indicating the status of the circuit(s), the device(s) or its battery, and may utilize an audible, such as recorded voice message, for such status information.

In one embodiment, the receiving system may be an integrated voice response system (IVR) and the communication device may be operable to communicate a dual-tone multi-frequency (DTMF) signal to the receiving system to communicate information regarding status of the first and second devices and the processor. In another embodiment, the receiving system may be operable to notify the electric utility or the customer of the customer location via e-mail, or in other embodiments, via pager, fax, telephone, whether wireless, cellular, or standard telephone system, utilizing an automated voice response system.

Such notification may include the duration of the outage and whether both the first and second circuits have lost power supply or whether only one of the circuits is without power. In one embodiment the power, including the current, voltage, of each circuit may be monitored by the first and second devices, analyzed by the processor and communicated to the receiving system, via the communication device. In another embodiment, the notification may include when the outage occurred, as well as when power was restored.

In one embodiment the first device and/or the communication device may be provided with a real-time clock such that when the communication device communicates with the receiving system, the communication device receives the actual current time from the receiving system. This allows the first device to communicate the status of power supply of the first circuit, including the time at which the first device detected a loss of the power supply at a particular circuit. In the embodiment where the first device is unitarily contained within the housing along with the communication device, the real-time clock may be provided in the housing with the communication device and the first device, while in other embodiments the second device may also include a real-time clock. In one embodiment, the customer location is a house or consumer or customer residence, while in other embodiments the customer location is a manufacturing or business facility.

According to another embodiment, the present invention provides a first device including a processor, a battery, an RF transceiver, an antenna and an external unit coupleable to the first circuit. In one embodiment, the first device and the second device communicate with one another in a wireless, peer-to-peer fashion, such as in the unlicensed ISM band, which includes 900 MHz. Virtually any available wireless or wired technology and protocols may be implemented with the present invention, including, without limitation, cellular, paging, rf modulation, infrared, IEEE 802.11x, BLUETOOTH, MINIONNET, ethernet, Internet data protocols, and power line carrier technology.

In one embodiment, the present invention provides a method for outage notification including providing an outage notification device, such as described above. The method includes providing the status of power supply at the first circuit to the communication device from the first device, and further providing the status of power supply at the second circuit to the communication device by the second device. The method further includes analyzing the status of the first and second devices' status of power supply of the first and second circuits, by the processor, to determine whether the outage is limited to only one of the first and second circuits, or whether both the first and second circuits are without power supply indicating a complete loss of power supply at the customer location.

One advantage of the present invention is the capability to intelligently detect and analyze the status of power supply at the customer location to discern between a loss of power on an individual circuit as opposed to loss of power on all monitored circuits indicative of a complete loss of power supply at the customer location. This allows for a more efficient response by dispatching the electric utility only when a complete outage has been detected or only notifying the customer or owner of the customer location when only some of the circuits have lost power supply.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which:

FIG. 5 is a block diagram illustrating an exemplary webpage or input interface for inputting contact information in accordance with at least one embodiment of the present invention.

DETAILED DESCRIPTION OF THE INVENTION

The following description is intended to convey a thorough understanding of the invention by providing a number of specific embodiments and details related to power outage notification. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
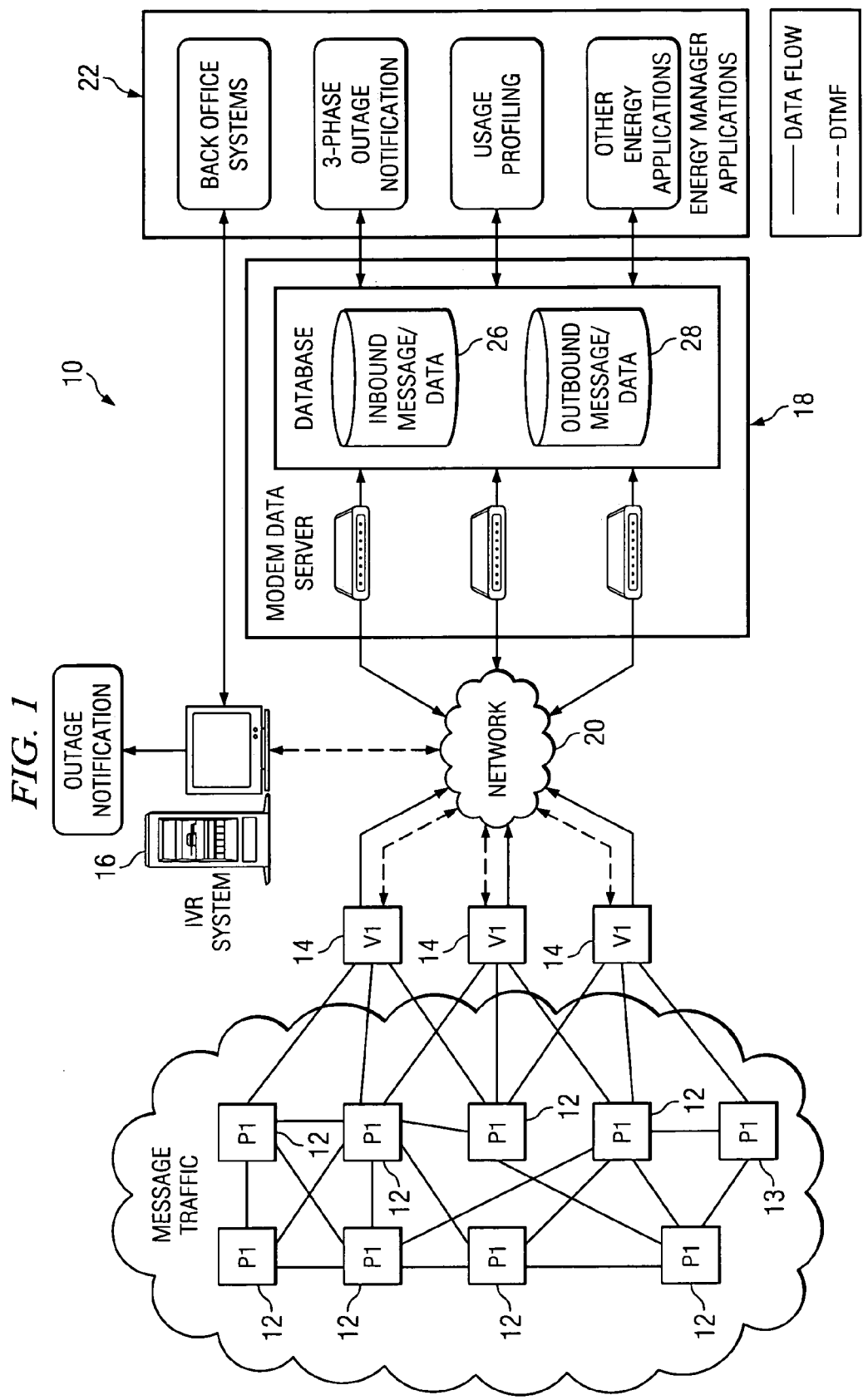
FIG. 1 is a block diagram illustrating an exemplary outage notification system in accordance with at least one embodiment of the present invention.

Referring now to FIG. 1, an exemplary outage notification system 10 for detection and notification in the disruption of power supply at a customer location is illustrated in accordance with at least one embodiment of the present invention. In the illustrated example, the outage notification system 10 includes a plurality of outage detection devices 12 capable of detecting the loss of power supply on one or more circuits at the customer location. The outage detection devices 12 are operable to communicate a status of power supply at the circuit being monitored as either available or unavailable. In this manner, a number of outage detection devices 12 may be utilized at various positions at the customer location, based upon the electrical topology within a particular structure, so that one or more electric circuits may be monitored by one or more outage detection devices 12. In one embodiment, a detector/controller device 13 is illustrated in communication with various detection devices 12. The detector/controller device 13 may be implemented to include any available device operable or capable of interfacing with or including a transducer to detect a value and/or control some value. For example, and without limitation, the detector/controller device 13 may be operable to read or detect such values as (i) temperature; (ii) instantaneous power consumption; (iii) energy consumption; (iv) data from local energy consumption meter; (v) humidity; (vi) carbon monoxide/dioxide levels; (vii) smoke; and (viii) air pressure. The outage notification system 10 may be implemented to provide the values read or detected by the detector/controller device 13 to a user when at certain intervals, when requested, or when certain conditions or limits are met. In still other embodiments, the detector/controller device 13 may be used to control a device, such as the temperature set point for an HVAC system.

The outage notification system 10 further may include one or more communication devices 14 operable to communicate with one or more of the outage detection devices 12 at the customer location, and further operable to communicate the status information relating to the power supply at the customer location to a receiver system associated with the electric utility. In at least one embodiment, the communication devices 14 implement some or all of the features of the outage detection devices 12 with the additional capability of communicating with the receiver system. Accordingly, reference to an outage detection device applies to a communication device, and vice versa, unless otherwise noted.

The receiver system may include any of a variety of communications systems that may be operated by or on behalf of an electric utility to receive indications of the status of power supply to the customer location and/or to provide updated software or other information to the communication devices 14 or the outage notification devices 12. To illustrate, the receiver system may include, for example, an IVR (integrated voice response) system 16 and/or a modem data server 18. Communication between the communication device 14 and the IVR system 16 or modem data server 18 may be accomplished via a network 20, such as a standard telephone network (e.g., a public switched telephone network or PSTN), an integrated digital services network (ISDN), or a data network such as a wide area network (WAN), a local area network (LAN), the Internet, a wireless or satellite network, or a combination thereof.

The communication device 14 communicates information to the IVR system 16 indicating the status of the power supply at the customer location as detected by the plurality of outage detection devices 12. In one embodiment, the communication device 14 and the IVR system 16 may be provided with dual-tone multifrequency (DTMF) communication capabilities to reduce the amount of data communicated between the communication device 14 and the IVR system 16 over the network 20, and also to reduce the setup time to establish communications. The communication device 14 also may be provided with modem capabilities to facilitate communication with the modem data server 18 via the network 20. In one embodiment, the communication device 14 may be capable of communication with both the IVR system 16 (e.g., using DTMF) and the modem data server 18 (e.g., using modem techniques). In this instance, the communication device 14 may be directed to initially attempt to communication with one of the IVR system 16 or the modem data server 18 and if the attempt fails or if the communication device: 14 is otherwise directed, the communication device 14 may then attempt to communicate with the other receiving system.

Further, the outage detection devices 12 or communication devices 14 may be adapted to receive and implement software updates or other data provided by the modem data server 18. Accordingly, the modem data server 18 may include, for example, one or more databases, such as an inbound database 26 to receive data from the communication device 14 and outage detection devices 12 and an outbound database 28 including data to be transmitted to the communication device 14, outage detection devices 12 and possibly one or more of the detector/controller device 13 for performing updates or providing additional information, data, software or other functionality for the communication devices 14, outage detection devices 12 or the detector/controller device 13.

The modem data server 18 and the databases 26, 28 provide a high degree of functionality in that the communication devices 14 and outage detection devices 12 may be programmed, updated, or otherwise interact with the outage notification system 10 in an "on-the-fly" manner. This update capability allows for continuing functionality to be provided to the communication device 14 and outage detection devices 12 without the need to physically change out these devices in the event of a change in function or operation of the outage notification system 10, such as the telephone number where the communication device 14 calls or more major functionality, such as to modify the fundamental manner and method by which the outage detection devices 12 communicate with one another, for example.

In certain instances, it may be more efficient to communicate certain data via one modem data server 18 instead of the IVR system 16. One example of such communication is where the modem data server 18 provides the communication device 14 with updated information or software or other programs or instructions related to the operation of the communication device 14 or outage detection devices 12 performing outage notification services at the customer location. Accordingly, the communication device 14 may be adapted to alternate between communication with the IVR system 16 and the modem data server 18 as appropriate or as needed.

Although the outage detection devices 12 are described herein primarily in the context of detecting power outages at a customer location, in various embodiments, the outage detection devices 12 and/or the detector/controller device 13 may be configured with one or more additional or alternate detection or measurement components for monitoring or controlling other aspects of the customer location, such as, for example, the temperature and/or humidity of one or more areas of the customer location, the presence and/or concentration of one or more chemical components (e.g., carbon monoxide) in the environment of the customer location, the electric consumption or other utility consumption of the customer location, and the like. To illustrate, where the detector/controller device 13 is employed to monitor temperature, a temperature monitoring device may be provided to monitor the temperature, such as in a large industrial refrigerator or food at a particular customer location, or within a room or area requiring a certain temperature for performance, such as a computer clean room or food storage room. These additional monitoring capabilities or other services may be provided as applications 22 in communication with the receiver system, such as the IVR system 16 and the modem data server 18.

It should be understood that the detector/controller devices 13 may be implemented to detect or read virtually any desired type of information. For example, detectors or transducers may be implemented in any such device to detect or read such information or conditions as (i) outage of a 3-phase electric power circuit; (ii) temperature; (iii) instantaneous power consumption; (iv) energy consumption; (v) data from local energy consumption meter; (vi) humidity; (vii) carbon monoxide/dioxide levels; (viii) smoke; (ix) air pressure; (x) outages of specific equipment; (xi) building security system malfunctions; (xii) heat; (xiii) fire; and (xiv) any of a variety of environmental readings. To implement such a system, the detector/controller device 13 will interface with or can be implemented to include detectors as desired. Such an implementation could be achieved by one of ordinary skill in the art. It should also be understood that the outage detection devices 12 or the detector/controller devices 13 may be implemented to include devices to remotely control other equipment, such as HVAC systems, boilers, security systems, and virtually any device, system or network capable of receiving electronic control signals. The detector/controller devices 13 may be programmed or provided data using one or more of the modules or applications of applications 22 in communication with the receiver system, such as the IVR system 16 and the modem data server 18, and/or through the information stored in the various databases of modem data server 18.

The present invention may include a peer-to-peer communications protocol or system that allows the various outage detection devices 12 to communicate with one another, in addition to communicating with communications device 14. Similarly, the various detector/controller devices 13 may communicate with one another or with the outage detection devices in a peer-to-peer manner, in addition to communicating with communications device 14. In yet another embodiment, an outage detection device 12 or a detector/controller device 13 may be equipped to serve as a local telephone outlet, while only being plugged into a local electrical outlet. In another embodiment, an outage detection device 12 or a detector/controller device 13 may be designed to function as a panic or emergency button to dispatch emergency personnel, such as fire or ambulance, when pushed. Such a system, in certain embodiments, may include a battery backup and function even if power has been lost at the facility. Emergency personnel would be notified through the outage notification system 10 using the receiver system.

Figure 2:
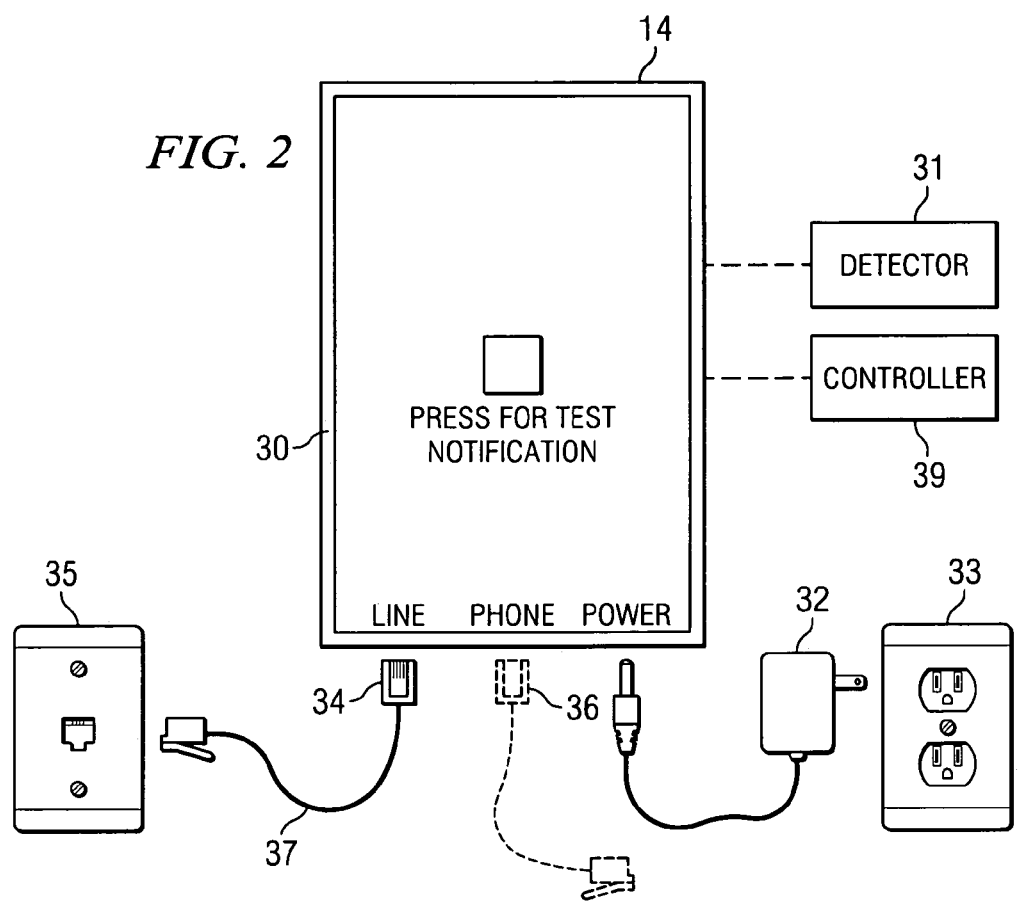
FIG. 2 is a front view of an exemplary outage detection device adapted for use in the exemplary outage notification system of FIG. 1 in accordance with at least one embodiment of the present invention.

Referring now to FIG. 2, an exemplary front view of the communication device 14 is illustrated in accordance with at least one embodiment of the present invention. As noted above, the communication device 14 and outage detection device 12, in one embodiment, are substantially similar except that the communication device 14 preferably includes an additional capability of communicating with a receiving system via a network. For ease of illustration, an exemplary communication device 14 is discussed in detail below. Some or all of the following description, however, also may apply to the outage detection devices 12 and/or the detector/controller devices 13 without departing from the spirit or scope of the present invention.

As illustrated, the communication device 14 may include a housing 30 constructed from any of a variety of materials, such as plastic or polymeric materials, steel, aluminum, or other well-known materials. Although the housing 30 is illustrated as a substantially rectangular box, it will be appreciated that the housing 30 may be configured in a number of shapes or dimensions as appropriate or desirable for these purposes.

In at least one embodiment, the communication device 14 may include not only the communication functionality so as to communicate with the modem data server 18 and/or IVR system 16 as described above, but also to perform outage detection functionality provided by the outage detection devices 12. Accordingly, the communication device 14 further may be provided with a circuit interface for connecting the communication device 14 to the respective circuit. The circuit interface may include any of a variety of devices that may be utilized to couple to a circuit and to detect the presence or absence of electrical power on the circuit. In one embodiment, the circuit interface includes an AC adaptor 32 operable to be received by an outlet 33 (e.g., a standard home wall power outlet) connected to a circuit at the customer location to obtain alternating current (AC) power from the circuit and transform the AC current to direct current (DC) current for use in powering the communication device 14. Although illustrated as separated from the housing 30, the AC adaptor 32 alternatively may be configured to be integral with the housing 30.

Further, in at least one embodiment, the DC output (or absence thereof) of the AC adaptor 32 may be used by the communication device 14 to monitor the status of power supply for the circuit to which the AC adaptor 32 is attached. To illustrate, while DC power is received by the AC adaptor 32, the communication device 14 may regard the status of the power supply as available (i.e., power is available in the respective circuit). However, when supply of DC power from the AC adaptor 32 ceases or is absent, the communication device 14 may regard the status of the power supply as unavailable (i.e., there is a power outage on the circuit).

The communication device 14 further may include one or more network interfaces (e.g., communication jacks 34, 36) for coupling to a network, such as a standard analog, digital, cable or other phone or communications lines. In the illustrated embodiment, the communication jack 34 includes an analog telephone jack (e.g., a RJ-11 jack) used by the communication device 14 to communicate over a telephone or other network via, e.g., phone cord 37 connected to, for example, a wall telephone jack 35. Likewise, the communication jack 36 may be provided for the convenience of the customer so that a dedicated telephone jack is not required and additional devices may utilize the same phone jack while the communication device 14 continues to have communications access. Fax machines, telephones or modems are examples of devices that may be coupled to the second communication jack 36. Although FIG. 2 illustrates one embodiment wherein the communication device 14 implements a connection to a telephone network for communications purposes, in other embodiments the communication device 14 may implement a network interface to any of a variety of networks, such as a coaxial cable jack for connection to a cable network, a Ethernet jack or other data network jack for communication via a dedicated data network, a modem chipset for data communications over a telephone network, a wireless or satellite transceiver, and the like.

It should be appreciated that while the communication device 14 is illustrated with the first jack 34 and an optional second jack 36 for adapting to a standard telephone line, in other embodiments the communication device 14 may communicate with the receiving system (e.g., modem data server 18 and IVR system 16) via the network 20 in a wireless, cellular, or other means of communication that would not require access to a wired analog or digital communication system. As such, the communication device 14 may be provided with wireless capabilities for communicating with the network 20, such as, for example, a 900 MHz or 2.4 GHz radio frequency (RF) transceiver commonly used in wireless telephones or a RF transceiver compliant with one or more wireless data network standards such as IEEE 802.11a/b/g. Further, in the illustrated example, the communication device 14 is provided with modem capability for communicating, via a telephone network or cable network system capable of DTMF signaling, with the IVR system 16, as well as negotiating a data connection, such as via the Internet or a wide area network for communication with the modem data server 18.

The communication device 14, the outage detection device 12, or the detector/controller 13 may include a detector for detecting.

Figure 3:
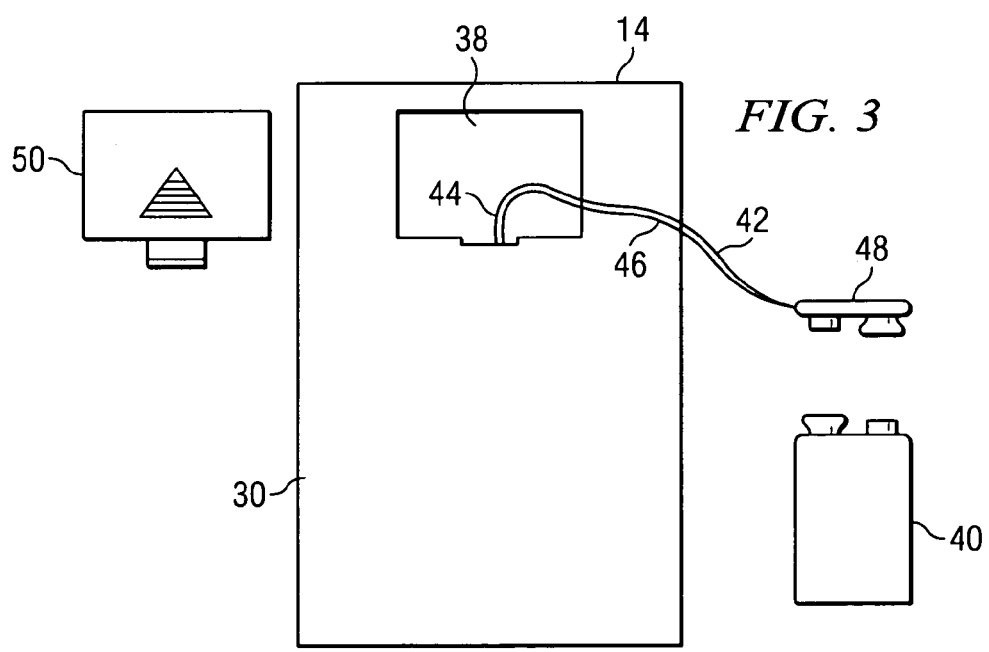
FIG. 3 is a back view of the exemplary outage detection device of FIG. 2 illustrating a battery backup for use when power supply is unavailable in accordance with at least one embodiment of the present invention.

Referring to FIG. 3, an exemplary back view of the communication device 14 shown in FIG. 2 is illustrated in accordance with at least one embodiment of the present invention. In the illustrated example, the communication device 14 may be configured such that the housing 30 is provided with a battery compartment 38 configured to receive one or more batteries 40 (e.g., a 9V battery). The communication device 14 may be provided with a communication line 42 connected at a first end 44 to power the communication device 14 and at a second end 46 to an adaptor 48 coupleable to the battery 40. The housing 30 may also be provided with a battery cover 50 connectable to the housing 30 to cover the battery 40, when the battery is positioned within the battery compartment 38.

During normal operation when power supply is available at the customer location, the communication device 14 may receive power primarily from the outlet 33 via the AC adaptor 32 (FIG. 2). In the event of a loss of power supply on the circuit being monitored by the communication device 14, the communication device 14 may switch to receive power from the battery 40 to continue operation.

Figure 4:
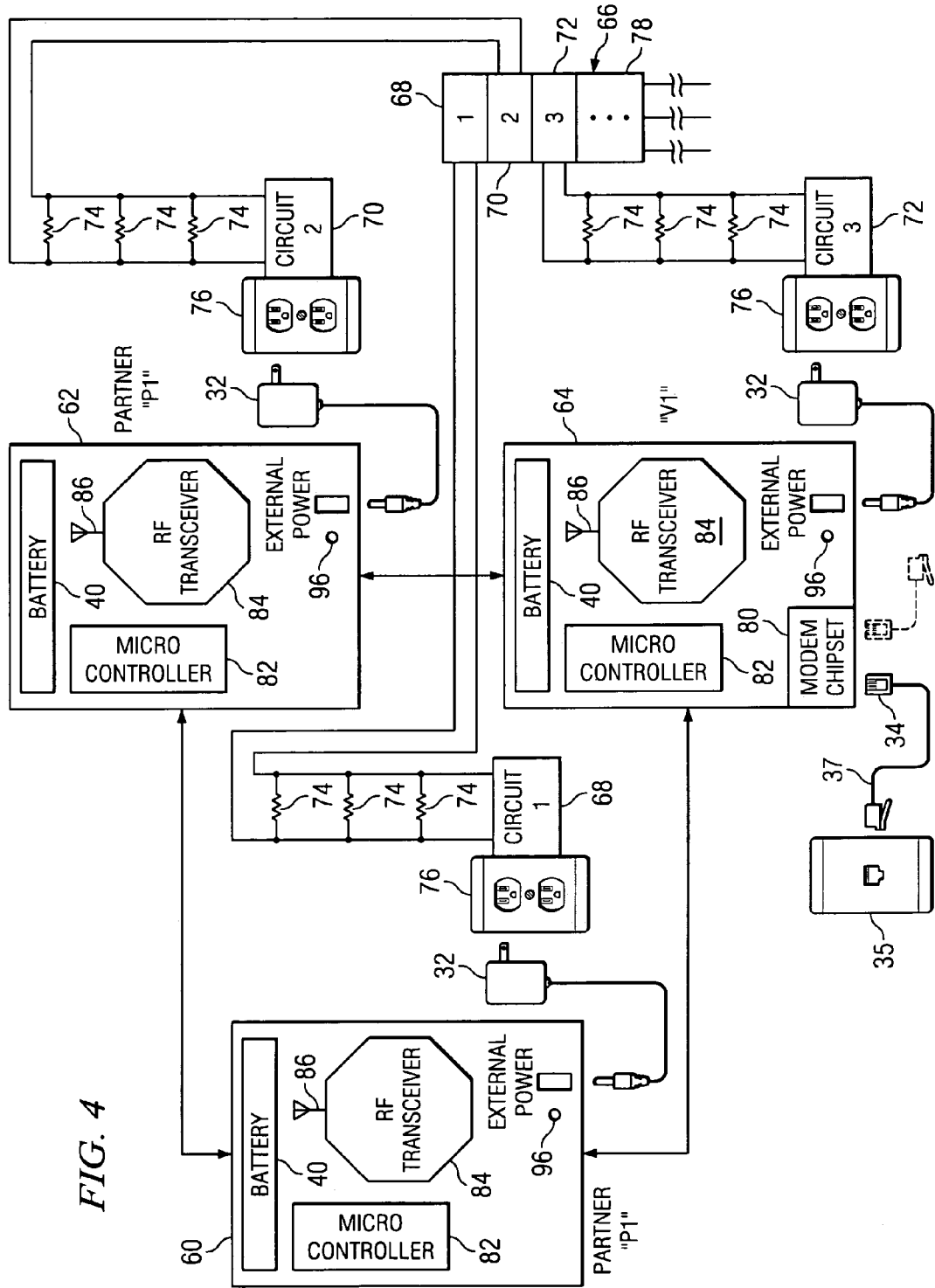
FIG. 4 is a schematic diagram illustrating an exemplary arrangement of outage detection devices and communication devices with respect to a plurality of electrical circuits at a customer location in accordance with at least one embodiment of the present invention.

Referring now to FIG. 4, an exemplary arrangement of outage detection devices to form a particular implementation of the outage notification system 10 is illustrated in accordance with at least one embodiment of the present invention. In the illustrated example, the outage notification system 10 includes a first outage notification device 60 and a second outage notification device 62, which are similar to the outage detection devices 12 illustrated in FIG. 1, and which are referred to as partner or "P1" devices herein. The illustrated outage notification system 10 also includes a communication device 64 substantially similar to the communication device 14 illustrated in FIGS. 1–3. Each of the first and second outage detection devices 60 and communication device 64 may be provided with batteries 40 and AC adaptors 32, as discussed above.

The first and second outage detection devices 60, 62 and the communication device 64 may be arranged to receive electric power from respective circuits at the customer location during normal operation and, in the event of a loss of power supply at the customer location or on a particular circuit, the devices 60, 62 and 64 may be each configured to switch to battery 40 power during an interruption.

As with most customer locations, such as private residences or business locations, power typically is received from the electric utility through a meter and into a main breaker box or fuse box 66. Although there are a number of configurations of power supply, such as single and three phase systems utilizing various amounts of current and voltage and having a number of fuse boxes, meters or mains, a single fuse box 66 having a first circuit 68, a second circuit 70 and a third circuit 72 will be described for purposes of clarity and simplicity herein. A plurality of devices or appliances 74 may exist on each of the circuits 68, 70 and 72 which may include outlets 76 into which the AC adaptors 32 may be plugged to receive power and monitor the power supply on the respective circuits 68, 70 and 72.

It will be appreciated that while the first and second outage detection devices 60, 62 and communication device 64 are shown coupled in this manner, additional circuits 78 and additional outage detection devices 60, 62 may be provided in various configurations such that all of the circuits at the customer location may be monitored or, alternatively, only critical circuits may be monitored. Also, the present invention may be employed for monitoring power in front of and behind the meter (not shown) or in front of the fuse boxes 66 or at various locations about the customer's residence or business without departing from the spirit and scope of the present invention as disclosed herein.

As previously discussed, the communication device 14 may be provided with modem capabilities, such as by providing a modem chipset 80 that is in communication with the first jack 34 which may receive a connection to a standard analog, digital or other telephone system for communication purposes (via, for example, wall jack 35). The communication device 14 may also be provided with DTMF communication capabilities. The communication device 14, as well as the first and second outage detection devices 60, 62, also may be provided with one or more microcontrollers 82 or processors and, in the illustrated embodiment, an RF transceiver 84 and antenna 86. The microcontrollers 82 may include internal memory, or the devices may include external memory, which is not specifically shown in FIG. 4.

In one embodiment, peer-to-peer wireless techniques may be implemented to facilitate communications between the first and second outage detection devices 60, 62 and communication device 64. Accordingly, the microcontrollers 82 may be programmed to implement various features in accordance with peer-to-peer wireless techniques, such as self-addressing and automatic communications initiation with other devices 60–64 by utilizing a communication protocol, such as BLUETOOTH, IEEE 802.11a/b/g or, in the present embodiment, utilizing technology described and disclosed in International Patent Application PCT/US00/14240, filed May 24, 2000, entitled "Wireless Transceiver Network Employing Node-to-Node Data Messaging", the entirety of which is incorporated by reference herein, which may be referred to as MINIONNET technology. The wireless communication disclosed in the above-referenced patent application is preferable to achieve wireless networking of intelligent transceiver nodes that employ local processing and node-to-node data messaging to hand-off messages from an origination point to a destination point. Utilizing such technology, the first outage notification device 60, when retrieved from the shipping container and brought within a certain range, such as three hundred feet, may begin to communicate, via a radio frequency such as 900 MHz or 2.4 GHz. Such communication may be encrypted or unencrypted as necessary or desirable.

The first outage notification device 60 may self-address with respect to the other devices 62 and 64 in use at the customer location without the need to hardwire an address, according to one embodiment. This enables a number of devices to be dynamically employed without the need to configure the devices 60–64 in advance of the installation. This provides one advantage of the present invention to promote easy installation and configuration of the outage notification system 10 and allow communication between the devices 60–64 may then continue uninterrupted in a wireless manner. For example, the first outage notification device 60 generates a message by the microcontroller 82 and transmits, via the RF transceiver 84 and antenna 86, a signal intended for the second outage notification device 62. The second outage notification device 62 receives the message via the antenna 86 and RF transceiver 84, and communicates the message to the microcontroller 82 of the second outage notification device 62. The communication between the devices 60–64 may occur in a serial manner such that the first outage notification device 60 communicates with the second outage notification device 62 information intended to be communicated to the communication device 64. The second outage notification device 62 then transmits the information to the communication device 64. In other embodiments, each of the devices 60, 62 and 64 may communicate with one another independently.

In one embodiment, when the communication device 64 is initialized for use, such as by removing it from its shipping container and plugging it into the outlet 76 and a telephone jack 35 via a phone cord 37, the communication device 64 may be configured to initiate a call with, or send a welcome message to, the IVR system 16 (FIG. 1) to provide the status of the communication device 64. Since the devices 60–64 may be provided with batteries 40, the devices 60–64 may begin announcing and communicating with one another even prior to being plugged into their respective outlets 76. In any event, once the devices 60–64 are installed for outage notification, the communication device 64 may also communicate with the IVR system 16 regarding the status of the first and second outage detection devices 60, 62 as provided by the devices 60, 62.

Each of the devices 60–64 may implement the microcontrollers 82, or other power detection circuitry known and available to one of ordinary skill in the art, to monitor the external power being received via the AC adaptors 32 from the outlet 76 and wirelessly communicate information regarding the status of power supply to one another, as well as to the communication device 64. In the illustrated example, the communication device 64 has capabilities for monitoring the power supply of the respective circuit 72 that are similar to the monitoring capabilities of the first and second outage detection devices 60, 62, as well as having communication capabilities for communicating with the IVR 16 and/or the modem data server 18. Although the illustrated outage notification system implements a single communication device 64 provided with this communication capability for ease of discussion, in other embodiments, either or both of first and second outage detection devices 60, 62 may be provided with this additional communication capability.

In one embodiment, the first and second outage detection devices 60, 62 and the communication device 64 are further provided with an indicator 96. The indicator 96 may be a light, such as a light emitting diode (LED), or a speaker for providing status information to the customer or a user of the outage notification device 10. It may be necessary to test or perform diagnostic routines on the devices 60–64 and will necessarily require feedback to the tester, which may be achieved by the indicator 96. In one embodiment, the indicator 96 may include both a speaker to sound when the battery is low, for example, and multiple LED lights, such as a red and a green LED for communicating information to the user of the present invention.

The devices 60–64 further may provide alarms to warn or advise the customers about the status of, for example, the battery. In this event, the microcontroller 82 may detect that the battery 40 is low. The microcontroller 82 therefore may be configured to initiate a flashing of the LED light in a particular sequence to identify to a user that the battery is low and should be replaced. Where the indicator 96 is a speaker, the microcontroller 82 may initiate a beeping or other sound, such as a voice, produced by the speaker to alert the user as to the status of the battery 40. Similar audible or visual signals may be provided by the indicator 96 with regard to a plurality of information such as when the devices 60–64 detect that power supply has been lost on the circuit being monitored. The indicator 96 may provide sound or light sequences according to pre-defined criterion that may be available in a user's manual or on the devices 60–64, so as to be readily available for the user to determine the meaning of the particular sequence. In other embodiments, the indicator 96 may produce recorded voice messages.

The devices 60–64 also may be provided with a test button (not shown) to initiate a diagnostic routine to verify that all of the components of the devices 60–64 are working properly. According to another embodiment, pressing the test button may initiate communication with the IVR system 16 and/or modem data server 18 for diagnostic purposes or for immediately initiating an outage notification alert to the receiver system, such as the IVR system 16. In one embodiment, the user depresses the test button (not shown) for several seconds, such as for four seconds, and the first outage notification device 60 begins sending RF packets. In this embodiment, a red LED indicator 96 flashes while packets are being sent. In response, the second outage notification device 62 and/or the communication device 64 send an acknowledgment. As RF communications are received by the first outage notification device 60, a green LED indicator 96 flashes to indicate that communications are being successfully received. In this manner, the 2-way communication of the first outage notification device 60 may be easily tested.

According to one embodiment the communication device 64 may be provided with a heartbeat function for the communication device 64 to initiate communication with the IVR system 16 at a pre-determined minimum interval, such as every 25 to 27 days, to provide routine interval status in the event no other information or contacts have been made between the communication device 64 and the IVR system 16 during that time period. During these communications, the IVR system 16 may direct the communication device 64 to initiate a digital communication with the modem data server 18 which typically would require disconnecting from the IVR system 16 connection and establishing a connection with the modem data server 18. The IVR system 16, however, may be in communication with the databases 26, 28 and obtain information to pass to the communication device 64 during the heartbeat function. During the communication between the communication device 64 and the modem data server 18 diagnostics may be performed on the communication device 64, as well as the first and second outage detection devices 60, 62. In addition, the modem data server 18 may provide the communication device 64 with updated software or instructions for more efficient operation or to modify specific capabilities or functionality of the communication device 64 or the first and second outage detection devices 60, 62.

The IVR system 16, according to one embodiment, initiates a communication with the communication device 64, such as by calling the communication device 64 directly via the network 20. During any communication between the communication device 64 and the IVR system 16, updated information including when to update and the priority of the update with the modem data server 18 may be provided as well. The communication device 64 may be further provided with a memory device operable for receiving and storing information from the first and second outage detection devices 60, 62, as well as outage detection information detected by the communication device 64.

The first and second outage detection devices 60, 62 and the communication device 64 may include a plurality of programmable parameters, such as to change the phone number and time at which communications are established. For example, one parameter establishes the minimum duration of an outage before initiating a communication with the IVR system 16 or modem data server 18, such as outages lasting for 10 seconds, or perhaps 60 minutes prior to reporting the outage. A number of other programmable parameters may be included as desired and implemented by one of ordinary skill in the art.

According to one embodiment, the communication device 64 may be provided with a real-time clock such that when the communication device 64 communicates with the IVR system and/or modem data server 18 the communication device 64 receive the current date and time. When an outage is detected by the first or second outage detection devices 60 or 62 or the communication device 64, the communication device 64 may be able to log the exact time the outage occurred.

It will be appreciated that because the time and outages actually logged would otherwise be the time the communication device 64 reports the outage to the IVR system 16 which may be several minutes or longer in the event of difficulty obtaining access to the telephone system or network 20. When the communication device 64 is provided with a real-time clock that is periodically updated, such as during the heartbeat function, the actual time the outage occurred may be communicated to the IVR system 16 regardless of when the communication device 64 actually establishes communication with the IVR system 16.

It will be appreciated that while the present system is described as utilized for detecting outage for power supply, the first and second outage detection devices 60, 62 and communication device 64 may also be employed, as previously discussed, for detecting or monitoring other information, such as temperature or other values. Such information may be easily monitored with the addition of thermometer capability or other desired capability operably provided on the devices 60–64.

Furthermore, the communication device 64 may be in communication with a programmable thermostat, such that communication between the communication device 64 and the IVR system 16, or the modem data server 18 may adjust the thermostat or other appliances or devices, such as equipment or systems within the customer location. In this manner, a customer, returning from a vacation having previously set the thermostat in a high energy conserving mode, for example, may contact the IVR system 16 with regard to the time the customer is returning and a desired thermostat setting. The IVR system 16 may initiate a communication to the communication device 64 which would operably adjust the desired appliance or equipment.

Similarly, the first and second outage detection devices 60, 62 may be coupled to other programmable or controllable appliances or equipment and such adjustments may be communicated from the communication device 64 to the first and second outage detection devices 60, 62 and the appropriate or desired changes would be made to the programmable settings of these coupled appliances or equipment.

In the present embodiment, the microcontroller 82 of the communication device 64 may receive information from both the first and second outage detection devices 60, 62 and intelligently process this information to determine the status of power supply at the customer location. For example, in the event the first outage notification device 60 detects loss of power supply on the circuit 68, the first outage notification device 60 may then communicate this information to at least the communication device 64. The second outage notification device 62 may verify the status of power supply on the second circuit 70 and determine whether the second circuit 70 has power supply available. The second outage notification device 62 may then communicate the status of power supply at the second circuit 70 to the communication device 64. The communication device 64 may determine the status of power supply at the third circuit 72 and determine whether power supply at the third circuit 72 also is available. Using the status information regarding the three circuits 68–72, the microcontroller 82 of the communication device 64 may determine whether a power outage affects the entire electrical system at the customer location or only a subset of circuits of the electrical system.

In any event, the communication device 64, according to one embodiment, may initiate a communication with the IVR system 16 via the network 20, based on any power outage detected on any of the circuits 68, 70 or 72 by any of the devices 60–64. The communication device 64 may then communicate the status of power supply detected by each of the devices 60–64 to the IVR system 16 using DTMF or other appropriate techniques.

As mentioned above, the communication device 64 and/or the outage detection devices 60 and 62 may include a panic or emergency button to dispatch emergency personnel, such as fire or ambulance, when pushed. This may be achieved using the IVR system 16 or the modem data server 18 through the network 20 so that emergency personnel may be dispatched to the address associated with the device. This provides the significant advantage of providing emergency panic buttons throughout a facility.

Referring now to FIG. 5, an exemplary interface or webpage 100 provided by an electric utility or other service provider is illustrated in accordance with at least one embodiment of the present invention. As described in detail herein, a customer may request that the outage notification system 10 notify the customer or the customer's representative of a power outage. When a customer requests outage notification service, the customer may provide information relevant to the outage notification, such as contact information for the appropriate individual(s) to be contacted, where the contact information may include, for example, fax numbers, telephone numbers, pager numbers, or email addresses to contact in the event of an outage.

In at least one embodiment, the electric utility may provide a website whereby this information may be input by the customer at one or more webpages of the website and then utilized by the electric utility to provide the requested type of customer notification. To illustrate, the website may include a webpage (not shown) whereby a customer may input a customer ID and password to gain access to information and features associated with the customer. The website further may include a webpage 100 for inputting contact information for one or more entities associated with the customer that are to be contacted in the event of a detected power outage. The input contact information may include, for example, the contacts' names via name fields 102a–102c, methods of contacting the contacts (e.g., automated telephone call, email, fax, pager, etc.) via contact method fields 104a–104c and contact address associated with the selected methods of contact (e.g., the contact's telephone, fax, or pager number, email address, etc.) via address fields 106a–106c. Further, in at least one embodiment, the customer may indicate a desired delay after a power outage before the respective entity is contacted by entering a value representing the desired delay in the corresponding delay fields 108a–108c. Additional or alternate information and input fields may be implemented by the webpage 100 without departing from the spirit or the scope of the present invention.

After providing the contact information, the customer may submit the information, via the website, to the electric utility for use in contacting the customer's representatives in the event of a power outage at the customer location. To illustrate by way of example, assume that the customer identifies two employees, Roger and Mary, as contacts in the event of a power outage at the customer location. Also assume that the customer indicates that Roger is to be contacted by email immediately after a detected power outage and by phone fifteen minutes after the detected power outage, as indicated by input provided by the customer in fields 102a, 102b, 104a, 104b, 106a, 106b, 108a and 108b of the webpage 100. Further, in the event that the power outage continues for at least thirty-five minutes, the customer may indicate that Mary is to be notified by fax by providing the corresponding information in fields 102c, 104c, 106c and 108c. Upon indication of a power outage at the customer location received via the outage notification system 10 (FIG. 1), the receiving system or other system associated with the electric utility may begin the process of notifying the customer's representatives in accordance with the process indicated by the customer via the webpage 100.

The website or a telephone information network also may provide additional information to the customer, such as a log of prior events or a current status of the outage notification system 10. To illustrate, the customer may be interested in knowing when a particular circuit has lost power, such as when a circuit provides power to devices that are critical to the business or residence, or the customer may desired information about the devices 60–64, such as operating status or battery charge status. In this instance, the website may provide such information based on information received from the devices 60–64.

Referring again to FIG. 4, the outage notification system 10 may be configured one or more of the customer's indicated representatives or the electric utility based at least in part on the overall status of the power supply at the customer location. For example, a power outage occurring on only one of the circuits, such as the first circuit 68, often indicates that the problem causing the power outage is local to the customer location and typically is not a result of a failure on the electric grid of the electric utility. Accordingly, the outage notification system 10 may be configured to initiate a contact with the customer, but not with the electric utility, in such instances since a complete power outage has not occurred and the loss of the power supply on the first circuit 68 is likely only a breaker or other localized problem to the customer location. Alternatively, this information may be provided by the customer to an electric utility representative via telephone communications or one or more mailed forms.

According to one embodiment, an intelligent outage detection process may be performed by the microcontroller 82 of the communication device 64 while in other embodiments an intelligent outage detection process may be performed by the IVR system 16 to more intelligently respond to outages of power supply at the customer location. The IVR system 16, according to one embodiment, may communicate with the modem data server 18, and determine an appropriate response to the outage notification at the customer location based on predefined criteria.

Figures 6, 7, 8:
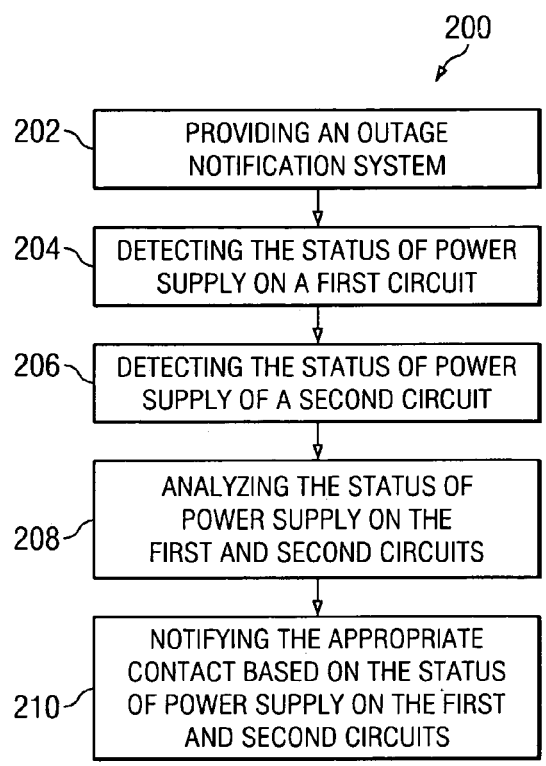
FIGS. 6 and 7 are logic charts illustrating exemplary responses based on a status of power supply to various circuits of the customer location as detected by multiple outage detection devices in accordance with at least one embodiment of the present invention.
FIG. 8 is a flow chart illustrating an exemplary outage notification method according to at least one embodiment of the present invention.

FIGS. 6 and 7 illustrate logic charts that may be employed as firmware or software by the microcontroller 82 of the communication device 64, the IVR systems 16, modem data server 18 or applications 22 (FIG. 1) to determine when to initiate communications with the customer and/or the power supply provider in the event of an outage. The logic chart of FIG. 6 illustrates an exemplary decision chart based on input received from the first outage notification device 60 and the communication device 64. The logic chart of FIG. 7 illustrates an exemplary decision chart based on input received from both outage devices 60, 62 and the communication device 64. Those skilled in the art may expand the logic charts to include any number of outage detection devices using the teachings provided herein.

Column 110 refers to the status of power supply as detected by the communication device 64, and column 112 refers to the status of power supply as detected by the first outage notification device 60. Column 118 refers to the status of power supply as detected by the second outage notification device 62. Columns 114a, 116a of the logic chart of FIG. 6 refer to the decision whether to contact the electric utility and the customer's representatives, respectively, based on the corresponding statuses from columns 110 and 112. Similarly, columns 114b and 116b of the logic chart of FIG. 7 refer to the decision whether to contact the electric utility and the customer's representatives, respectively, based on the corresponding statuses from columns 110, 112 and 118. When these devices 60–64 detect that power is available or on a "0" may be indicated and when power is detected as unavailable or off a "1" may be indicated in the corresponding columns 110, 112, and 118. The corresponding decision to contact the electric utility or customer may be indicated by a "Y" (yes) or "N" (no) in the respective columns 114a/114b and 116a/116b.

As the logic chart of FIG. 6 illustrates, a number of different power configurations may be detected by both the first outage notification device 60 and communication device 64, but only one of which would yield a call to the electric utility. This is another advantage of the outage notification device 10 in that a number of power detection scenarios may yield notifications to the customers or their representatives, such as when a particular circuit or circuits are without power, but only when outages have been detected by all of the devices 60 and 64 will the electric utility be notified. Thus, the outage notification system 10 may intelligently discern when a complete power outage has occurred at the customer location.

The logic chart of FIG. 7 further illustrates the efficiency of the present invention by producing only one contact to the electric utility out of the eight possible scenarios of power supply when detecting three circuits. The addition of numerous circuits, monitored numerous outage detection devices, generates a large number of potential scenarios of the power supply at a particular customer location that could produce false alarms or calls to the electric utility reporting of an outage, when in fact only a particular circuit or circuits have actually lost power. Thus, the present invention provides for more efficient and effective responses to detection and notification in the event of electrical power outage.

Referring now to FIG. 8, an exemplary outage notification method 200 is illustrated in accordance with at least one embodiment of the present invention. The method 200 initiates at block 202 whereby the outage notification system 10 is provided as described above. One or more outage detection devices 60, 62 and/or communication devices 64 may be provided at a business or residential customer location for monitoring a source of power.

The method provides, at block 204, for detecting the status of power supply on the first circuit 68 by the first outage notification device 60. At block 206, the method provides for detecting the status of power supply at the second circuit 70, by the second outage notification device 62. It will be appreciated, however, that in some embodiments, the second outage notification device 62 may be eliminated and only the communication device 64 may be utilized when employing the method of the present invention. In this instance, the communication device 64 may be employed to monitor the second circuit 70 in instances where only two devices 60, 64 are employed.

At block 208, the communication device 64 analyzes the status of power supply as detected on the first and second circuits 60 and 70 to determine whether an outage event or other monitored event has occurred. At block 210, the method further includes notifying, such as by the communication device 64, the appropriate contact based on the status of power supply on the first and second circuits 68 and 70.

In such instances, the communication device 64 may communicate with the IVR system 16 utilizing, as previously discussed, DTMF to perform this communication exchange. In addition, the communication device 64 may communicate with the modem data server 18 when appropriate for transmitting and receiving additional information related to the operation and service of the first and second outage detection devices 60, 62 and communication device 64 or to provide detailed information to the modem data server 18.

In one embodiment, the method 200 may further include diagnostic routines, such as by pressing a test button either unilaterally or in response to the indicator 96 prompting a response by the user. The test initiating a diagnostic routine of the outage prompting the communication device 64 to initiate communication with the IVR system 16 and/or modem data server 18 for these purposes.

In another embodiment, the transfer of information between the modem data server 18 and the communication device 64 may include updates or upgrades to the microcontroller 82 or instructions utilized by the microcontroller 82 of the communication device 64 or the first and second outage detection devices 60 and 62. In one embodiment, the method 200 includes indicating, by the indicator 96, a sequence of perceptible light or sounds and associating a meaning to the sequences.

The method 200 further may include the customer of the outage notification system 10 providing contact information, such as email, pager or telephone contact information, via a webpage, telephone, or other means. The outage notification system 10, (via the receiver system) may contact the customer in the event of an outage detected. The databases 26 and 28 of the outage notification system 10 may be used for tracking or logging each event, such as a low battery, power outage, including the date, time and duration of the outage. This and other associated data may be accessible, such as via the network 20, by users of the present invention.

In another embodiment, the method 200 provides for coupling the communication device 64 to the outlet 76 or other connections to the circuits at the customer location and, in response thereto, the communication device 64 initiating a welcome communication to the IVR system 16 and/or modem data server 18 indicating that the communication device 64 is operational. Additional communications may include handshakes or announcements between the first and second outage detection devices 60 and 62 and the communication device 64 so that the communication device 64 provides status information to the IVR system 16 and/or modem data server 18 relevant to the outage detection status of newly connected devices such as the first and second outage detection devices 60, 62.

In some embodiments, the communication between the first and second outage detection devices 60, 62 and the communication device 64 may be via RF communication, while in other embodiments, the communication between these devices may occur via the power lines at the customer location or the telephone lines within the customer location. In some embodiments the communication device 64 communicates with the IVR system 16 and modem data server 18 via the modem chipset 80 and possibly through a DTMF circuitry coupled to the communication device 64 via a standard telephone network, while in other embodiments the communication device 64 may communicate wirelessly with the IVR system 16 and modem data server 18.

The method 200 may also include detecting for power supply while in other embodiments the method may provide for monitoring temperature or other desired values at the residence or business customer location. In one embodiment, the communication device 64 is operable to initiate communications with the IVR system 16 and/or modem data server 18, while in other embodiments the communication device 64 is able to receive communications initiated by the IVR system 16 and/or modem data server 18.

As previously discussed, the method 200 may include the communication device 64 initiating a heartbeat function to periodically communicate with the IVR system 16 and modem data server 18 at pre-determined time intervals. During such heartbeat communications, the IVR system 16 may designate the time, and priority of communication to be established between the communication device 64 and the modem data server 18 for receiving, for example, programmable parameters to change settings or receive upgrades from the modem data server 18.

Based upon the type of outage that is detected, the outage notification system 10 may access the databases 26, 28 and initiate a communication with the appropriate contact. For example, the electric utility may be contacted when a complete outage is detected or only the customer's representatives may be contacted in the event of an outage on only one or more of the circuits.

Thus, it is apparent that there has been provided, in accordance with the present invention, an outage notification system and method that satisfy one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the techniques, systems, subsystems, and methods described and illustrated in the preferred embodiment as discrete or separate may be combined or integrated with other systems, modules, techniques, or methods without departing from the scope of the present invention. Other items shown as directly coupled to each other may be coupled through some other interface or device, such that the items may no longer be considered directly coupled to each other but may still be in communication with one another. Other examples of changes, substitutions, and alterations are readily ascertainable by one skilled in the art and could be made without departing from the spirit and scope of the present invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An outage notification system for detecting a power outage at a customer location, the system comprising:
   a first device operably coupled to a first circuit at the customer location;
   a second device operably coupled to a second circuit at the customer location;
   wherein the first device is operable to:
      determine a status of power supply to the first circuit; and
      communicate the status of power supply to the first circuit to the second device;
   wherein the second device is operable to:
      determine a status of power supply to the second circuit; and
      notify, via a network, a receiving system associated with the electric utility of a power outage at the customer location based at least in part on the statuses of power supply to the first and second circuits.

2. The outage notification system of claim 1, further comprising the receiving system and wherein the receiving system is operable to notify the electric utility of the power outage when the statuses of power supply to the first and second circuits indicate that power supply is unavailable in both the first and second circuits.

3. The outage notification system of claim 1, further comprising the receiving system and wherein the receiving system is operable to notify at least one representative of a customer of the power outage when the statuses of power supply to the first and second circuits indicate that power supply is unavailable in at least one of the first and second circuits.

4. The outage notification system of claim 3, wherein the receiving system is operable to notify the at least one representative of the customer by transmitting an email to at least one email address associated with the at least one representative.

5. The outage notification system of claim 3, wherein the receiving system is operable to notify the at least one representative of the customer by transmitting a facsimile to at least one facsimile number associated with the at least one representative.

6. The outage notification system of claim 3, wherein the receiving system is operable to notify the at least one representative of the customer by transmitting a voice message to at least one telephone number associated with the at least one representative.

7. The outage notification system of claim 3, wherein the receiving system is operable to notify the at least one representative of the customer by transmitting a page to at least one pager number associated with the at least one representative.

8. The outage notification system of claim 1, further comprising a third device operably coupled to a third circuit, the third device operable to: determine a status of power supply to the third circuit; and communicate the status of power supply to the third circuit to the second device.

9. The outage notification system of claim 8, wherein the second device is operable to notify the receiving system of a power outage at the customer location based at least in part on the statuses of power supply to the first, second and third circuits.

10. The outage notification system of claim 9, further comprising the receiving system and wherein the receiving system is operable to notify the electric utility of the power outage when the statuses of power supply to the first, second and circuits indicate that power supply is unavailable in each of the first, second and third circuits.

11. The outage notification system of claim 1, wherein the first and second devices each include a wireless transceiver and wherein the first device is adapted to communicate the status of power supply to the first circuit to the second device via the wireless transceiver.

12. The outage notification system of claim 1, wherein the second device includes a network interface operably coupled to the network for communicating with the receiver system via the network.

13. The outage notification system of claim 12, wherein the network includes a cable network.

14. The outage notification system of claim 12, wherein the network includes a telephone network.

15. The outage notification system of claim 14, wherein the receiver system includes integrated voice response (IVR) system coupled to the telephone network and wherein the second device is adapted to communicate with the IVR system via the telephone network using at least one dual-tone multifrequency (DTMF) signal.

16. The outage notification system of claim 14, wherein the receiver system includes a modem data server coupled to the telephone network and wherein the network interface includes a modem chipset for communicating with the modem data server via the telephone network.

17. The outage notification system of claim 1, wherein the first device includes an alternating current (AC) adaptor operably connectable to an outlet associated with the first circuit and wherein the first device is adapted to determine the status of power supply to the first circuit based at least in part on an output of the AC adaptor.

18. The outage notification system of claim 17, wherein the second device includes an alternating current (AC) adaptor operably connectable to an outlet associated with the second circuit and wherein the second device is adapted to determine the status of power supply to the second circuit based at least in part on an output of the AC adaptor of the second device.

* * * * *